United States Patent [19]

Vaughn et al.

[11] Patent Number: 4,661,634

[45] Date of Patent: Apr. 28, 1987

[54] REMOVAL OF IMPURITIES FROM AMINES

[75] Inventors: Walter L. Vaughn; Milton S. Wing, both of Lake Jackson, Tex.

[73] Assignee: The Dow Chemical Company, Midland, Mich.

[21] Appl. No.: 776,348

[22] Filed: Sep. 16, 1985

[51] Int. Cl.$^4$ ................... C07C 91/26; C07C 91/28
[52] U.S. Cl. .................................. 564/292; 523/202
[58] Field of Search ..................... 564/292; 523/202

[56] References Cited

U.S. PATENT DOCUMENTS 2,775,604 12/1956 Zech ................................. 564/292
3,468,816 9/1969 Thompson ....................... 564/292

Primary Examiner—Werren B. Lone
Attorney, Agent, or Firm—Walter J. Lee

[57] ABSTRACT

Particles, fibers, or filaments of alkali salts of ethylene/-carboxylic acid copolymers or terpolymers, especially in highly porous form, are employed in removing contaminants from tertiary amines or quaternary amine salts, especially metal contaminants.

29 Claims, No Drawings

REMOVAL OF IMPURITIES FROM AMINES

FIELD OF THE INVENTION

Impurities are removed from tertiary amines or quaternary ammonium salts by using ethylene/carboxylic acid polymers.

BACKGROUND OF THE INVENTION

Copolymers of ethylene and unsaturated carboxylic acids, such as ethylene/acrylic acid, ethylene/methacrylic acid and the like, are known. It is known that such polymers can be produced as pellets, powders, small strands, and the like to increase the surface area/weight ratio. U.S. Pat. No. 3,798,194 discloses the digestion of ethylene/acrylic acid (EAA) polymers in an alcoholic alkali (e.g. NaOH) with stirring to spontaneously convert the polymer into colloidal size particles. U.S. Pat. No. 3,790,521 discloses the digestion of EAA polymers in an amine, with agitation, to produce non-colloidal size small particles and short, fine fibers. U.S. Pat. No. 3,801,551 discloses hot-drawing EAA polymers as strands, chopping the strands into pellets, digesting the pellets with an alkali, and shearing the pellets into short, fine fibers. Whereas such above forms of the polymers are operable in the invention described hereinafter, there has now been found a novel method of producing high surface area polymers (e.g. EAA) wherein the particles and fibers are large enough to be more easily managed than the colloidal sizes, and more efficient than the fine fibers of the above-discussed patents. In accordance with this novel polymer preparation, there is prepared particles and fibers which are highly porous, having a substantial amount of microporosity, thereby providing very high surface areas per bulk volume of the particles. This novel preparation is discussed more fully hereinafter.

SUMMARY OF THE INVENTION

Impurities are substantially removed from tertiary amines, especially a quaternary ammonium salt, such as tetraalkylammonium halide or 1-halo-2-hydroxyalkyl-trialkyl ammonium halide compounds, by contacting a fluid form or solution of the amine compound with a particulate or fibrous form of an alkali salt of an ethylene/unsaturated carboxylic acid polymer, such as ethylene/acrylic acid copolymer or ethylene/methacrylic acid copolymer, especially where such polymer particles or fibers are highly porous. The alkali salt of the acid groups on the polymer may be the amine salt, the ammonium salt, or the alkali metal salt.

The present invention is a method of removing undissolved, dissolved, polar, or ionizable contaminants (impurities) from fluid tertiary amine or quaternary amine salt, said method comprising contacting the said contaminated (impure) fluid amine with an ethylene copolymer having pendant carboxylic acid groups in the alkali salt form, said copolymer being in particulate form having a surface area/weight ratio of at least 1 m$^2$/gm, and separating the amine from the polymer.

DETAILED DESCRIPTIONS

Quaternary ammonium salts are known to be produced by reacting a tertiary amine with an alkyl halide, producing compounds of the formula $R_4NX$, where R represents alkyl and/or substituted alkyl groups and X is, e.g., a halide, nitrate, sulfate, hydroxyl, sulfite, nitrite, thiosulfate, and carbonate, or mixtures of these. The R groups may all be the same, or may be different, some or all of which may be substituted. An example is a 1-halo-2-hydroxyalkyl-trialkyl ammonium halide, such as 1-chloro-2-hydroxypropyl-trimethyl ammonium chloride. These compounds are highly polar, leading to an affinity for impurities which are usually found in the quaternary products when made under commercial conditions; these impurities, which usually cause an undesirable color, are generally difficult to remove efficiently. Among the principal impurities which find their way into the system are metal compounds such as various forms of iron, e.g., rust particles, soluble ferric ion, and particulate iron silicates. Other impurities include, e.g., $Cr^{+++}$, $Cu^{++}$, $Zn^{++}$, $Mg^{++}$, $Ca^{++}$, $Al^{+++}$, and the like.

The use of various filters and ion exchangers for removing the impurities have not been entirely satisfactory and more efficient methods and materials have been sought.

Whereas this disclosure is directed principally to the preferred quaternary ammonium salts, it is within the purview of the invention to cleanse other amines, especially tertiary amines such as trimethylamine, triethylamine, and the like. Furthermore salt forms of quaternary compounds other than halides may be used, such as nitrates and sulfates and the like.

The ethylene/unsaturated carboxylic acid polymers for use in the present invention comprise, preferably, ethylene/acrylic acid copolymers (EAA) and ethylene/methacrylic acid copolymers (EMAA), though other unsaturated polymerizable carboxylic acids, such as crotonic acid, itaconic acid, fumaric acid, maleic acid, and the like may be used. The ethylene/acid polymers may also contain minor amounts of other polymerizable unsaturated monomers, such as propylene, butene, styrene, vinyl compounds, acrylic esters, methacrylic esters, and the like. These ethylene/acid polymers are normally solid at ambient temperatures, generally having a number average molecular weight of at least about 6000 and a weight average molecular weight of at least about 16000, and generally exhibit a melt flow rate (MFR) in the range of about 15-2600 g/10 min. as measured in accordance with ASTM D-1238. A typical MFR of about 300 +100 g/10 min. is quite suitable.

The amount of the acid groups in the polymer may vary over a wide range of about 8% to about 40% by weight, preferably about 12% to about 40%, most preferably about 20% to about 40%.

When employed as a colloidal or very fine suspension in water, the alkali salt of the ethylene/acid polymer is found to chemically react with, and form flocs with, the impurities in the amine solution; these flocs are then filtered out, or otherwise removed, from the solution, taking the impurities with them. When employed as larger particles or as fibers added to the amine solution, these also chemically react with the impurities and are filtered out, or are otherwise removed, from the solution, taking the impurities with them. Particulate sizes having surface area/weight ratio of at least about 1 m$^2$/gm should be used, preferably greater than about 5 m$^2$/gm.

Fibrous arrays, such as beds or mats, can serve the dual role of filter (for "non-attachable" impurities) and as a scavenger for the "attachable" impurities; thus inert solid impurities as well as reactive solid impurities and dissolved impurities are removed. Woven, non-woven, knitted, or sintered arrays of fibers or filaments may be used.

As stated supra, various forms of the ethylene/acid polymers may be used including (but not limited to) those produced by the techniques in U.S. Pat. Nos. 3,798,194, 3,790,521, and 3,801,551. A particularly effective and preferred form is the novel porous form prepared in accordance with cofiled patent application Serial No. 776,534. Stated simply, the porous polymers are prepared by reacting cold-drawn (oriented) polymer with a reagent which reacts with the reactable pendant side-groups on the polymer (such as —COOH groups), causing swelling of the polymer; then after fibrillation and washing, the fibers are found to be extensively microporous, a substantial amount of the pores being of sub-micron size. This porosity and microporosity is an especially useful feature in the present invention, most especially when the polymer is used in the dual role of scavenger and filter.

The temperature used in the present invention may be any convenient temperature below the softening point of the polymer and the decomposition or degradation or boiling temperature of the amine or amine solution. Operating at temperatures at which the polymer melts or fuses, or at temperatures at which the amine or amine solution is not stable, would be counterproductive. One would not, of course, want to use temperatures at which the amine or amine solution is frozen or non-fluid. Satisfactory results are obtained at ambient, or near ambient, conditions.

The amount of polymer used in removing the impurities from the amine should be commensurate with the concentration of impurities in the amine, for a given polymer. The extent to which the polymer can scavenge impurities is directly related to the concentration of the acid groups pendant from the polymer molecule. It is preferred to use polymers which contain at least about 12% by weight of acid groups, most preferably about 20–40%. If the first treatment with polymer is found to have given incomplete removal of impurities, due to use of too small an amount, then one or more further treatments can be easily done to essentially remove the impurities to at least a tolerable level. Highly efficient removal of impurities is achieved by passing the amine through a bed, column, or other array of the polymer, either upflow or downflow or crossflow. Highly efficient removal of impurities is also achieved by mixing the polymer into the amine, then filtering out the polymer or decanting the amine.

We have found that novel "quat acrylate copolymers" are formed as intermediates when the quaternary ammonium salts are combined by reaction, or ion exchange, with the ethylene/acid polymers when the acid groups are in the form of an alkali salt. For example, an ethylene/ammonium acrylate copolymer reacts with 1-chloro-2-hydroxypropyl-trimethyl ammonium chloride to form ethylene/1-chloro-2-hydroxypropyl-trimethylammonium acrylate copolymer (swollen in size from the original polymer) and a side-product, ammonium chloride. This reaction occurs even in the presence of a contaminating amount of iron. Some of these enlarged (swollen) "quat acrylate copolymer" particles then chemically react with the iron compounds, which puts a corresponding amount of 1-chloro-2-hydroxypropyl-trimethylammonium ions back into solution and puts the iron into the polymers for easy removal. This phenomenon provides a novel convenient process whereby a neatly prepared "quat acrylate copolymer" can be added to a contaminated quaternary ammonium salt in an amount calculated or determined to correspond to the theoretical amount needed to react with the metal impurities in the quaternary ammonium salt; then by exchange of ions, the metal groups attach to the acid groups as the quaternary groups come off the acid groups and go into solution. This novel technique is especially effective when the ethylene/acid polymer is of the high-porosity variety, whereby a much greater percent of the acid groups are stoichiometrically available for the reactions involved. Non-porous, relatively large particles of the ethylene/acid copolymer are likely to have acid groups within the interior of the particle which may not be "reached" by the reactants.

The following examples are to illustrate embodiments of the present invention, but the invention is not limited to the particular embodiments shown.

EXAMPLE 1

An aqueous solution containing 60% by weight of 1-chloro-2-hydroxypropyl-trimethylammonium chloride, contaminated with about 40 ppm iron in the form of iron silicate and soluble iron chloride which gives a dark brown color to the solution, is passed through a bed of fibers made substantially in accordance with the procedure disclosed in U.S. Pat. No. 3,801,551. The fibers are prepared by chopping hot-drawn strands of EAA (20% AA, 300 M.F.R.) into pellets; digesting (and swelling) the pellets overnight at 50° C. with a sufficient amount of 0.5N NaOH to give a molar ratio of 0.4 NaOH/1.0AA (as —COONa groups); draining off excess liquid; slurrying the swollen pellets in de-ionized water; fibrillating the pellets in a Waring blender for a few minutes, thereby obtaining small fibers; filtering; and water-washing the fibers. These fibers are too short to effectively form a good mat or felt by vacuum-deposition from an aqueous slurry onto a foraminous substrate.

The fibers (a 3.6 gm portion), exhibiting a surface area of greater than $4 m^2/gm$ and a 20–40 mesh fiber size are placed in a 100-ml burette (with glass wool placed above and below to prevent fiber displacement or floating) to form a fiber bed depth of about 2 inches. About 20 ml. of deionized water is run downwardly through the column to wet down and "pack" the bed. The column is then filled to the 100 ml. mark, providing a head of 16–18 inches of fluid and a residence time in the column of about 6.1 minutes at the flow rate of 1.32 ml./min. About a liter of so-treated amine is collected as a water-white solution having an iron content of less than 1.0 ppm and no "breakthrough" is encountered. The polymer fibers become discolored to a dark reddish-brown, especially near the top of the bed of fibers.

EXAMPLE 2

The contaminated bed of polymer in Example 1 above is regenerated by flushing out residual amine, using deionized water. About 2 bed volumes of conc. HCl are passed through the bed to take out the contaminants, regenerate the —COOH groups, and return the polymer to an almost colorless form. The bed is washed with deionized water to remove the HCl and is used again as in Example 1 to remove contaminants from more of the amine, obtaining essentially the same results as in Example 1.

The bed is again regenerated as above and again used in removing contaminants from the amine. Essentially the same results are obtained and no deterioration of the resin is found after these 3 cycles of use.

EXAMPLE 3

An aqueous solution containing 60 wt. % 1-chloro-2-hydroxypropyl-trimethylammonium chloride and about 40 ppm of iron (dark brown solution) contamination (colloidal iron silicate, some soluble iron chloride) was treated with an aqueous dispersion which contained 5 wt. % of fine particle size ethylene/ammonium acrylate copolymer. The copolymer contained about 20% by weight acrylic acid and had a MFR of about 1300 g/10 min., the acid groups being neutralized with ammonia during dispersion, the particles so-dispersed being smaller than about 1000 angstroms in diameter. The treatment was done by adding the polymer dispersion to the contaminated quaternary compound to a concentration of 1000 ppm of the polymer. The mixture was stirred 5 minutes to mix the dispersion thoroughly and floc the ethylene-ferric acrylate copolymer and entrain the particulate ferric silicate. The floc, containing the iron, was removed by filtration through a 10–15 micron filter (medium frit) under vacuum. The filtrate was colorless and contained less than 1 ppm iron, as measured by emission spec.

EXAMPLE 4

A 0.1″ diameter strand of EAA copolymer (20% AA, 300 M.F.R.) was cold-drawn to 15–20% orientation and then swollen 4 hours in 0.61 N NaOH at 60°–65° C., giving —COONa) groups. The filament was pressed with a steel roller which caused it to fibrillate into a "tape" of microfilament bundles and then was pulped into an aqueous slurry (0.5% solids) using a Waring blender for a few seconds. The so-formed pulp fibers were, typically, ribbon-like strands of about 5 micron thickness, about 35 micron width, and about 3/16″ to ¼″ length. The blades of the Waring blender were intentionally installed backward in order to "beat" the polymer into pulp rather than use the sharp edge of the blades which would cut the fibers; cutting the fibers would result in fewer fibrils and more fines.

Some of the pulp fibers were washed and vacuum-drawn as a felt on a 100-mesh stainless steel screen. The felt was air dried and resembled bleached cellulosic paper, the fibrils exhibiting good entanglement and resulted in enchanced felt integrity.

Both the felt and the pulped fibers are found to be effective in removing iron contamination from an aqueous solution containing 60% by weight of 1-chloro-2-hydroxypropyl-trimethylammonium chloride contaminated with about 40 ppm iron silicate/iron chloride, yielding a water-clear solution containing less than 1 ppm iron.

EXAMPLE 5

An EAA copolymer such as in Example 4 is melt-spun through orifices which yield strands of 10, 20, and 30 microns diameter. The strands are found to swell in less than 5 minutes at 55° C. in 0.5N NaOH solution, giving —COONa) groups. The swollen material, chopped into fibers of about 0.5–1.0 inch length, and cast onto a stainless steel screen (100 mesh) is found to have few fibrils, thus almost no fibril entanglement, and felts prepared from the melt-spun fibers do not have the strength of those which have more fibrils.

These fibers are used in successfully removing iron contaminants as in Example 4, yielding a colorless filtrate of less than 1 ppm iron.

We claim:

1. A method of removing undissolved, dissolved, polar, or ionizable contaminants from an impure fluid tertiary amine or quaternary amine salt, said method comprising
   contacting the said fluid amine or amine salt with an ethylene copolymer having pendant carboxylic acid groups in the alkali salt form, said copolymer being in particulate form having a surface area/weight ratio of at least about 1 m$^2$/gm, and
   separating the fluid amine or amine salt from the particulate polymer whereby impurities are removed from the amine or amine salt,
   while maintaining the temperature above the freezing point of the fluid amine or amine salt and below the boiling point or decomposition point of the amine or amine salt as well as below the melting point of the said copolymer.

2. The method of claim 1 wherein the amine is in solution in water.

3. The method of claim 1 wherein the amine is a tertiary amine.

4. The method of claim 1 wherein the amine is a quaternary ammonium salt.

5. The method of claim 1 wherein the amine is a quaternary ammonium salt conforming essentially to the empirical formula R$_4$NX,
   where R represents alkyl and/or substituted alkyl groups and X represents at least one inorganic salt moiety of the group comprising halide, nitrate, sulfate, hydroxyl, sulfite, nitrite, thiosulfate, and carbonate.

6. The method of claim 1 wherein the amine salt is the quaternary ammonium salt, 1-chloro-2-hydroxypropyl-trimethyl ammonium chloride.

7. The method of claim 1 wherein the contaminants in the amines comprise metal compounds.

8. The method of claim 1 wherein the contaminants in the amines comprise iron compounds.

9. The method of claim 1 wherein the ethylene polymer comprises ethylene copolymerized with an olefinically-unsaturated carboxylic acid of the group comprising acrylic acid, methacrylic acid, crotonic acid, fumaric acid, maleic acid, itaconic acid and butenoic acid.

10. The method of claim 1 wherein the ethylene polymer comprises ethylene copolymerized with acrylic acid.

11. The method of claim 1 wherein the ethylene polymer comprises ethylene copolymerized with methacrylic acid.

12. The method of claim 1 wherein the ethylene polymer comprises small particles and/or fibers which are porous.

13. The method of claim 1 wherein the ethylene polymer comprises an array of small particles or fibers composited in the manner of a filter material.

14. The method of claim 1 wherein the ethylene polymer comprises a woven, non-woven, knitted, or sintered array of fibers or filaments.

15. A composition comprising ethylene/1-chloro-2-hydroxypropyl-trimethylammonium acrylate copolymer.

16. The method of claim 1 wherein the said contacting is done by mixing together the fluid amine or amine salt and the said copolymer.

17. The method of claim 1 wherein the said contacting is done by passing the said fluid amine or amine salt through a quantity of the said copolymer, whereby impurities are removed from the said amine or amine salt.

18. The method of claim 1 wherein the said contacting is done by mixing together the fluid amine or amine salt and the said copolymer, and the said separating is done by filtering the said copolymer out of the said amine or amine salt, whereby impurities are removed from the said amine or amine salt.

19. The method of claim 1 wherein the said alkali salt form of the said acid groups is an amine salt, an ammonium salt or an alkali metal salt.

20. The method of claim 1 wherein the said alkali salt form of the said acid groups is the sodium salt.

21. The method of claim 1 wherein the said alkali salt form of the said acid groups is the ammonium salt.

22. The method of claim 1 wherein the temperature is ambient or near ambient.

23. The method of claim 1 wherein the copolymer has a MFR in the range of about 15–2600 g/10 minutes.

24. The method of claim 1 wherein the copolymer has a MFR in the range of 300±100 g/10 minutes.

25. The method of claim 1 wherein the amount of acid groups in the said copolymer is in the range of about 8% to about 40%.

26. The method of claim 1 wherein the amount of acid groups in the said copolymer is in the range of about 12% to about 40%.

27. The method of claim 1 wherein the amount of acid groups in the said copolymer is in the range of about 20% to about 40%.

28. The method of claim 1 wherein the impurities comprise soluble metal compounds or particles of metal compounds.

29. The method of claim 1 wherein the impurities comprise soluble metal compounds or particles of metal compounds of Fe, Cr, Cu, Zn, Mg, Ca, or Al.

* * * * *

UNITED STATES PATENT AND TRADEMARK OFFICE
CERTIFICATE OF CORRECTION

PATENT NO. : 4,661,634

DATED : April 28, 1987

INVENTOR(S) : Walter L. Vaughn & Milton S. Wing

It is certified that error appears in the above-identified patent and that said Letters Patent is hereby corrected as shown below:

Col. 2, line 45, "300 + 100" should be --300$\pm$100--.

Col. 5, line 32, "-COONa)" should be --(COONa)--.

Col. 5, line 34, "10" should be deleted.

Col. 5, line 63, "-COONa)" should be --(COONa)--.

Col. 6, line 37, "1=chloro-2-" should read --1-chloro-2---.

Signed and Sealed this

Fifteenth Day of December, 1987

Attest:

DONALD J. QUIGG

*Attesting Officer*   *Commissioner of Patents and Trademarks*